US006218922B1

(12) United States Patent
Clark et al.

(10) Patent No.: US 6,218,922 B1
(45) Date of Patent: Apr. 17, 2001

(54) BEARINGS FOR PROPORTIONAL SOLENOID

(75) Inventors: Bruce D. Clark, Phelps; Philip C. Priolo, Jr., Canandaigua, both of NY (US)

(73) Assignee: G. W. Lisk Company, Inc., Clifton Springs, NY (US)

( * ) Notice: Subject to any disclaimer, the term of this patent is extended or adjusted under 35 U.S.C. 154(b) by 0 days.

(21) Appl. No.: 09/580,391

(22) Filed: May 26, 2000

(51) Int. Cl.[7] .............................. F16K 31/06; H01F 3/00; H01F 7/08

(52) U.S. Cl. .............................. 335/262; 29/596; 29/607; 264/272.12

(58) Field of Search .................................... 335/255, 261, 335/262, 270, 279; 384/32; 251/129.08, 129.15; 29/596, 607; 264/272.19, 272.12

(56) References Cited

U.S. PATENT DOCUMENTS 3,202,749 8/1965 White .................................. 264/242
3,510,814 * 5/1970 Nordfors ............................ 335/262
3,699,282 10/1972 Jepson et al. ...................... 200/38 A
4,131,866 12/1978 Torr .................................... 335/262
4,438,419 3/1984 Helinski .............................. 335/261
4,656,448 4/1987 Luetzow .............................. 335/262
4,790,345 * 12/1988 Kolchinsky ......................... 137/269
5,527,117 6/1996 Roy .................................. 400/109.1
5,782,162 6/1998 Lanteigne .............................. 92/168

* cited by examiner

*Primary Examiner*—Ramon M. Barrera
(74) *Attorney, Agent, or Firm*—Eugene Stephens & Associates

(57) ABSTRACT

Proportional solenoids have low friction bearings formed by molding a pair of annular bearings in imprecise grooves formed in armatures so that radially outer surfaces of the bearings have a precise and low friction fit within precision machined interiors of solenoid housings. The bearings can be formed on body or push rod portions of the armatures and can have different outside diameters that are formed in a single precision mold to ensure concentricity and accuracy without requiring precision machining of armature or bearing surfaces.

11 Claims, 2 Drawing Sheets

BEARINGS FOR PROPORTIONAL SOLENOID

TECHNICAL FIELD

Manufacture of proportional solenoids.

BACKGROUND OF THE INVENTION

Proportional solenoids position an armature axially within a housing as a function of applied current or voltage. Ideally, the armature can move to infinitely variable positions corresponding accurately to infinite variations in the applied voltage or current. To accomplish this in practice, though, requires that the armature move with very low friction within the housing, and achieving this has made proportional solenoids expensive.

The housing, the armature, and sometimes bearings arranged between the armature and the housing all have to be machined accurately for the sliding axial fit of the armature within the housing to have minimal friction. Diameters and concentricity of bearing surfaces must be highly accurate to minimize friction, and location and shape of bearing surfaces must be considered to minimize effects of side or off-axis loading. These needs have required that all contacting surfaces be accurately machined, and errors that inevitably occur in attempting to accomplish this adversely affect solenoid performance.

The machining accuracy that is required to keep friction low in proportional solenoids increases their price sufficiently so that some users who could benefit from proportional solenoids avoid them in favor of simpler and lower cost non-proportional solenoids, even though performance is less than optimum. Our invention aims at reducing the cost of making proportional solenoids accurate enough to minimize friction.

SUMMARY OF THE INVENTION

Our invention recognizes a way that precision bearing surfaces can be molded on a solenoid armature so that precision machining can be limited to a housing for the armature to simplify and reduce the cost of making proportional solenoids. Precision molding of resin bearings formed in imprecise grooves in an armature ensures precise and accurate diameters and concentricity for a pair of armature bearings. These can then slide precisely within one or two machined surfaces of a housing to minimize friction. In effect, precision invested in a bearing mold for an armature eliminates any precision machining of the armature so that relatively simple precision machining of one or two inside diameters of a housing is all that is needed for an accurate fit between the housing and the molded armature bearings to minimize sliding friction of an armature of a proportional solenoid.

DETAILED DESCRIPTION

Figure 1:
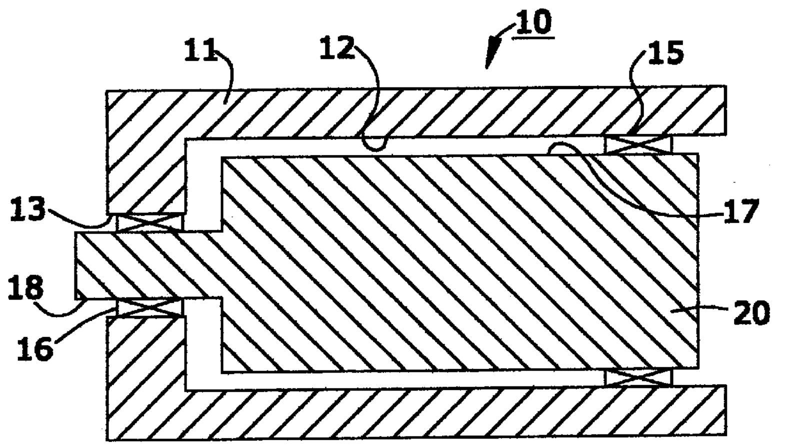
FIG.1 PRIOR ART
FIG. 1 is a partially cross-sectioned and partially schematic view of a prior art proportional solenoid having bearings between an armature and a housing.

A typical prior art way of arranging bearings in a proportional solenoid 10 is shown schematically in FIG. 1. This requires precision machining of several surfaces. Housing 11 of solenoid 10 has precision machined internal surfaces 12 and 13 to engage bearings 15 and 16. These are typically press fitted onto precision machined surfaces 17 and 18 of armature 20. Also, bearings 15 and 16 often have radially outer surfaces precision machined for an accurate sliding fit within the interior of housing 11. Several variations on the illustrated prior art arrangement are also possible, but they all involve expensive precision machining of multiple surfaces that must achieve an accurate sliding fit.

Figure 2:
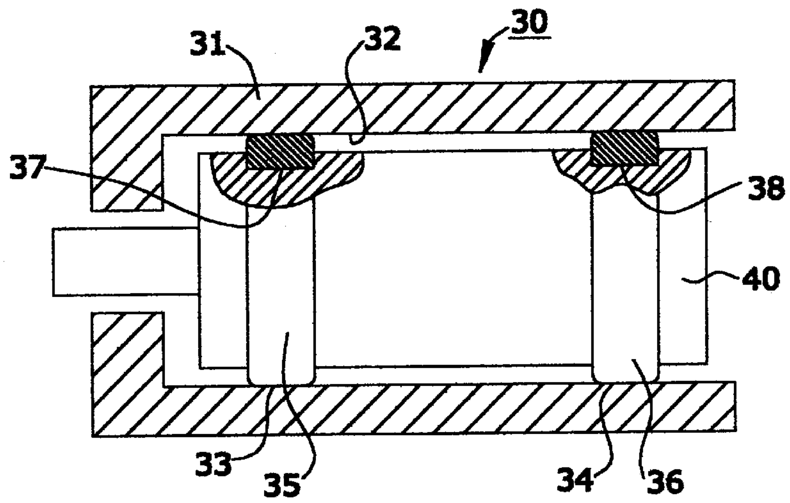
FIGS. 2 and 3 show alternative preferred embodiments of the inventive molded bearings formed in grooves in a partially cutaway armature to achieve a low friction sliding axial fit in a solenoid housing shown in cross section.

FIG. 2 illustrates a preferred embodiment of the inventive way of providing precision molded bearings 35 and 36 for an armature 40 axially slideable within a housing 31 of proportional solenoid 30. Bearings 35 and 36 are spaced apart axially of armature 40 to minimize side loading or off-axis forces. The configuration of solenoid 30 allows bearings 35 to be concentric and have equal diameters to fit accurately within a single precision machined interior surface 32 of housing 31, to minimize precision machining.

Each of the annular bearings 35 and 36 is formed in a respective annular groove 37 and 38 machined or otherwise formed in armature 40. Grooves 37 and 38 are imprecise and do not have to be accurately machined.

Bearings 35 and 36 are molded to be retained in grooves 37 and 38 and to extend radially beyond a peripheral radial surface of armature 40 as illustrated. Since bearings 35 and 36 are precision molded, their radially outer or peripheral surfaces 33 and 34 are made accurately concentric and accurately equal in diameter for a precise and low friction sliding fit within housing surface 32.

Figure 3:
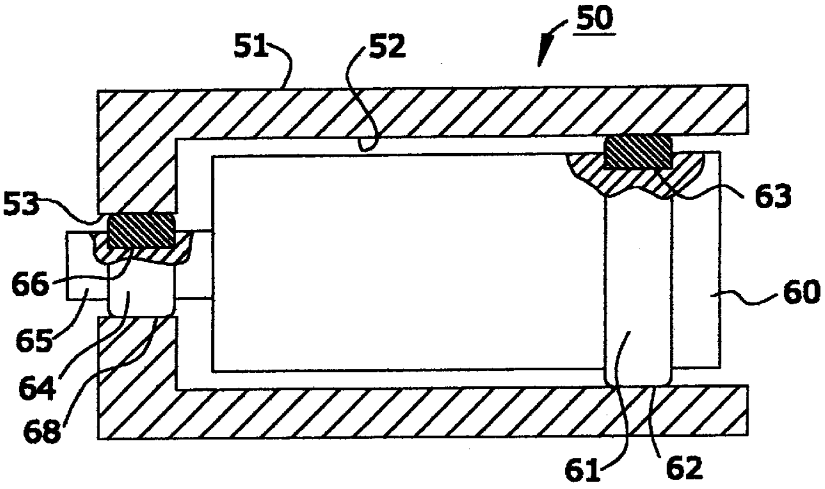

Another preferred embodiment of proportional solenoid 50 is illustrated in FIG. 3. Its housing 51 has a pair of precision machined interior surfaces 52 and 53 having different diameters and being accurately concentric. Armature 60 has one molded bearing 61 formed in an imprecise groove 63 in an armature body and another bearing 64 formed in another imprecise groove 66 machined in a push rod 65 forming a portion of armature 60. This results in bearing 64 having a radially outer surface 68 with a smaller diameter fitting housing surface 53, and bearing 61 having a larger diameter outer surface 62 fitting housing interior surface 52. Radially peripheral surfaces 62 and 68 of annular bearings 61 and 64 are also molded to be accurately concentric for a low friction sliding fit within precision machined surfaces 52 and 53.

Many solenoid armatures have push rods, which rods can be grooved to receive one of the armature bearings. The attachment of push rods to armature bearings raises a possibility of concentricity error; but the inventive way of molding armature bearings automatically cancels out any concentricity error between the body portion and the push rod portion of an armature. This results from a single accurate mold forming both armature bearings, whether located on the body portion or the push rod portion of the armature.

Many other arrangements of bearings molded on solenoid armatures to fit within solenoid housings are possible beyond the preferred embodiments illustrated in FIGS. 2 and 3. All of these arrangements have in common that a pair of bearings are axially spaced on the solenoid armature and are precision molded for an accurate fit within one or more precision machined interior surfaces of a solenoid housing. They also have in common the fact that the pair of bearings formed on a solenoid armature are molded in a single precision mold having a pair of cavities that ensure accurate concentricity as well as accurate outer diameters of the molded bearings.

Outer surfaces of molded armature bearings can vary in configuration and in area of contact with a solenoid interior. Some experimentation is needed to minimize friction by configuring the peripheral surfaces of molded bearings, and such configurations can vary with the bearing material selected.

A resin chosen for molding armature bearings is preferably designed for bearing purposes and preferably has high dimensional stability (between 0 to 0.0005 inches) and a low coefficient of friction (ranging from 0 to 0.2). Using the smallest practical amount of resin for each of the armature bearings helps minimize shrinking after molding; and we prefer that armature bearings be formed of 0.01 to 0.02 cubic inches per bearing, for typical bearing diameters. This means that grooves formed in solenoid armatures to receive molded bearings can be shallow and that bearings need extend radially only a small distance beyond the radial periphery of an armature. By using a small volume of resin for each bearing, dimensional changes in the bearings after molding can be held to a range of 0 to 0.0005 inches. These measures, along with precision configuration of a bearing mold, can form bearings having radially outer surfaces held to a high degree of accuracy.

Figure 4:
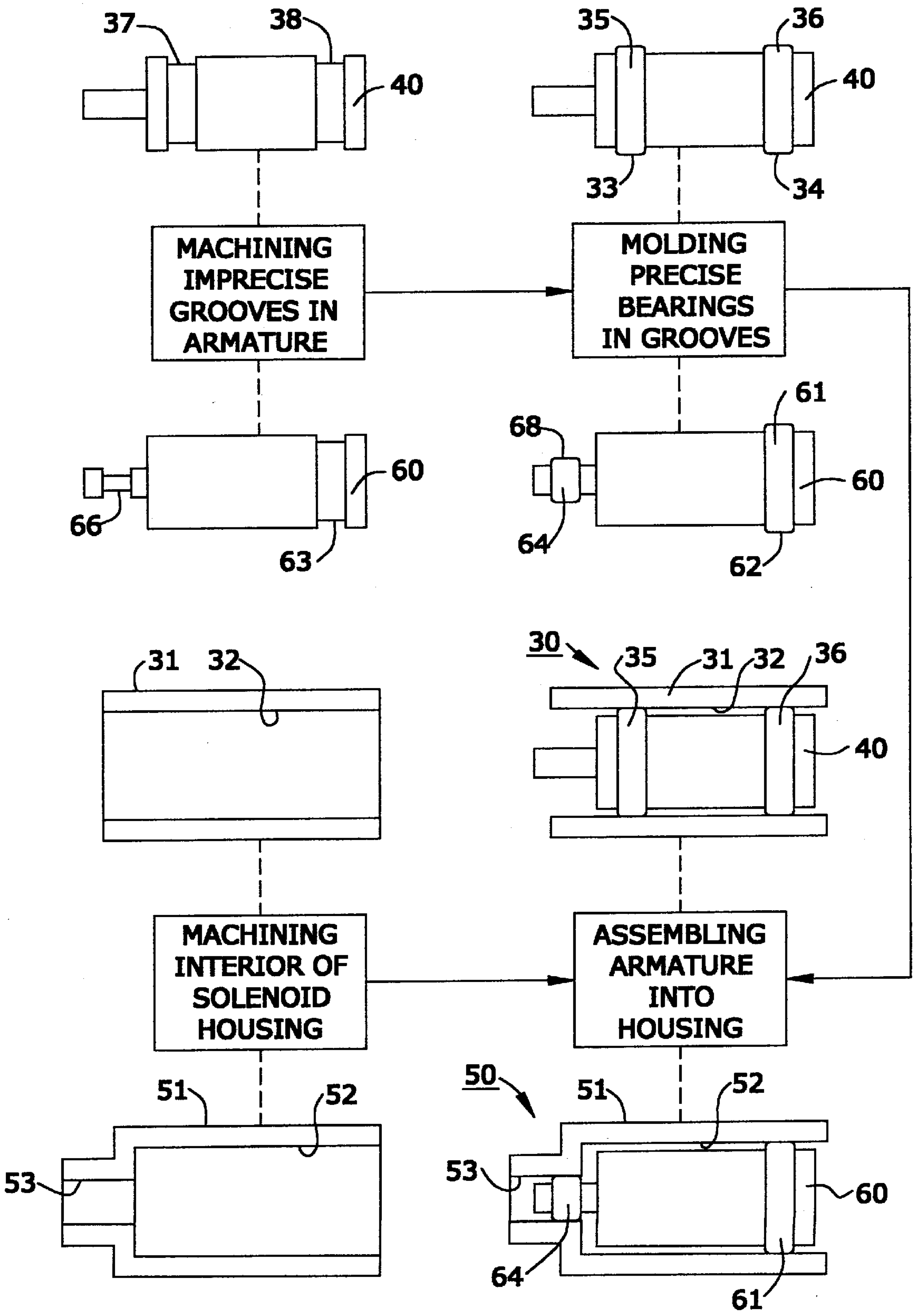
FIG. 4 is a schematic diagram of steps involved in making a proportional solenoid having the inventive bearings applied to the preferred embodiments of FIGS. 2 and 3.

FIG. 4 illustrates a preferred method of forming low friction solenoid bearings after armatures and housings are roughly formed. A first step is machining or otherwise forming imprecise grooves 37 and 38 in armature 40 or grooves 66 and 63 in armature 60. Then, bearings are molded precisely in the grooves of armatures 40 or 60 to form precision bearings 35 and 36 having outer surfaces 33 and 34 or precision bearings 61 and 64 having outer surfaces 62 and 68. In each case, the radially outer surfaces of the pair of bearings on each armature 40 and 60 are accurately concentric and have accurately predetermined diameters. A single mold having a pair of bearing cavities registering with the grooves of each armature ensures this precision.

In preparation for solenoid assembly, an interior surface 32 of solenoid housing 31 is accurately machined to a predetermined diameter; or for an alternative embodiment, interior surfaces 52 and 53 of solenoid housing 51 are accurately machined to concentric but different diameters. Armatures 40 and 60 with their respective molded bearings 35, 36 and 61, 64 are then assembled into respective solenoid housings 31 and 51. This gives bearings 35 and 36 a low friction sliding fit within interior housing surface 32 and correspondingly gives bearings 61 and 64 a low friction sliding fit within respective housing surfaces 52 and 53.

Solenoids 30 and 50, formed and assembled by the inventive method, have optimally low friction movement of armatures 40 and 60 and are also made at significantly less expense than is required for precision machining of multiple surfaces of prior art proportional solenoids. The invention can thus make low friction proportional solenoids available at a lower cost, allowing the advantages of proportional solenoids to be used in previously unaffordable circumstances.

We claim:

1. A proportional solenoid manufacturing method comprising:

a. forming a solenoid armature with a pair of imprecise annular grooves spaced apart axially of the armature;

b. inserting the armature into a single precision mold having a pair of bearing cavities so that the armature grooves register with the bearing cavities;

c. injecting bearing resin into the cavities to form an annular bearing in each of the annular grooves so that the bearings extend radially outward from the armature to outer bearing surfaces;

d. using the precision mold to make the outer bearing surfaces precisely concentric even though the armature grooves may not be precisely concentric;

e. using the precision mold to form the outer bearing surfaces at predetermined precise diameters;

f. machining a solenoid housing to form a precise inner configuration engaging the outer bearing surfaces; and g. inserting the armature into the solenoid housing so that the outer bearing surfaces slidably engage the inner configuration of the solenoid housing in an accurate and low friction sliding fit.

2. The method of claim 1 including molding the bearings of a resin having high dimensional stability and a low coefficient of friction.

3. The method of claim 1 including forming the outer bearing surfaces with different diameters and machining the internal configuration of the solenoid housing with correspondingly different diameters.

4. The method of claim 3 including forming one of the bearings in a groove on a push rod portion of the armature.

5. The method of claim 1 including molding the bearings of a sufficiently small amount of resin so that dimensional changes in the molded bearings remain within 0 to 0.0005 inches.

6. A proportional solenoid manufactured by the method of claim 1.

7. A proportional solenoid having a bearing system comprising:

a. an armature for the solenoid having a pair of annular bearings precision molded of a bearing resin;

b. each of the bearings being formed in an imprecise annular groove in the armature;

c. the annular bearings being spaced apart axially of the armature;

d. the annular bearings extending radially beyond the armature to outer bearing surfaces;

e. the outer bearing surfaces being precisely concentric and having precise diameters;

f. a housing for the solenoid having a precision machined interior dimensioned to engage the outer bearing surfaces; and g. the armature being arranged within the housing so that the outer bearing surfaces accurately engage the precision machined interior of the housing for low friction axial sliding motion of the armature within the solenoid housing.

8. The solenoid of claim 7 wherein the bearing resin has high dimensional stability and a low coefficient of friction.

9. The solenoid of claim 7 wherein the outer bearing surfaces have different diameters, and the machined internal configuration of the solenoid housing has correspondingly different diameters.

10. The solenoid of claim 9 wherein a smaller diameter one of the bearings is formed in a groove on a push rod portion of the armature.

11. The solenoid of claim 7 wherein the volume of resin forming the bearings is sufficiently small so that dimensional changes in the bearings remain within 0 to 0.0005 inches.

* * * * *